US011309573B2

(12) United States Patent
Sugihara et al.

(10) Patent No.: US 11,309,573 B2
(45) Date of Patent: Apr. 19, 2022

(54) CELL STACK DEVICE, MODULE, AND MODULE HOUSING DEVICE

(71) Applicant: KYOCERA Corporation, Kyoto (JP)

(72) Inventors: Kazunari Sugihara, Kagoshima (JP); Makoto Koi, Kagoshima (JP)

(73) Assignee: KYOCERA Corporation, Kyoto (JP)

( * ) Notice: Subject to any disclaimer, the term of this patent is extended or adjusted under 35 U.S.C. 154(b) by 233 days.

(21) Appl. No.: 16/345,280

(22) PCT Filed: Oct. 26, 2017

(86) PCT No.: PCT/JP2017/038732
§ 371 (c)(1),
(2) Date: Apr. 26, 2019

(87) PCT Pub. No.: WO2018/079665
PCT Pub. Date: May 3, 2018

(65) Prior Publication Data
US 2019/0296385 A1    Sep. 26, 2019

(30) Foreign Application Priority Data

Oct. 27, 2016  (JP) .............................. JP2016-210735
Mar. 23, 2017  (JP) .............................. JP2017-057653

(51) Int. Cl.
*H01M 8/2485*    (2016.01)
*H01M 8/2475*    (2016.01)
(Continued)

(52) U.S. Cl.
CPC ..... *H01M 8/2485* (2013.01); *H01M 8/04201* (2013.01); *H01M 8/2475* (2013.01); *H01M 8/12* (2013.01)

(58) Field of Classification Search
CPC ........... H01M 8/2485; H01M 8/04201; H01M 8/2475; H01M 8/12
See application file for complete search history.

(56) References Cited

U.S. PATENT DOCUMENTS

2005/0164067 A1    7/2005  Ooshima et al.
2008/0138665 A1*   6/2008  Lewinski .............. H01M 8/241
                                                         429/434
(Continued)

FOREIGN PATENT DOCUMENTS

CN    103143799 A     6/2013
JP    2002336990      11/2002
(Continued)

OTHER PUBLICATIONS

JP 201681912 MT (Year: 2016).*
The decision to grant a Patent granted by JPO for Application No. 2018547758 (Year: 2020).*

*Primary Examiner* — Alexander Usyatinsky
(74) *Attorney, Agent, or Firm* — Viering, Jentschura & Partner MBB

(57) ABSTRACT

A cell stack device may include a cell stack of connected cells, a manifold configured to fix lower ends of the cells and supply a reaction gas into gas flow passages of the cells, and a reaction gas supply pipe connected to the manifold and configured to supply the reaction gas to the manifold. The manifold may include an insertion portion connecting the reaction gas supply pipe to the manifold, and a gap between the insertion portion and the reaction gas supply pipe. The manifold may further include a first joining portion joining the insertion portion and the reaction gas supply pipe and configured to seal an end of the gap. In a cross-section along an insertion direction of the reaction gas supply pipe, the first joining portion may have a meniscus shape, and a joint length is longer than a thickness of the reaction gas supply pipe.

20 Claims, 12 Drawing Sheets

(51) Int. Cl.
*H01M 8/04082* (2016.01)
*H01M 8/12* (2016.01)

(56) References Cited

U.S. PATENT DOCUMENTS

| | | | | |
|---|---|---|---|---|
| 2011/0117457 | A1* | 5/2011 | Nakamura | H01M 8/04014 |
| | | | | 429/408 |
| 2014/0004439 | A1 | 1/2014 | Ohmori et al. | |
| 2014/0234743 | A1* | 8/2014 | Sasamoto | H01M 8/2483 |
| | | | | 429/456 |
| 2014/0295303 | A1* | 10/2014 | Matsuo | H01M 8/04388 |
| | | | | 429/423 |
| 2017/0040633 | A1* | 2/2017 | Kawaguchi | C25B 9/70 |

FOREIGN PATENT DOCUMENTS

| | | | |
|---|---|---|---|
| JP | 2005000971 | | 1/2005 |
| JP | 2005158531 | * | 6/2005 |
| JP | 2014143162 | | 8/2014 |
| JP | 201681912 | * | 5/2016 |
| JP | 2016081912 | | 5/2016 |
| WO | 2015163277 | | 10/2015 |
| WO | WO 2015163277 | * | 10/2015 |

\* cited by examiner

CELL STACK DEVICE, MODULE, AND MODULE HOUSING DEVICE

CROSS-REFERENCE TO RELATED APPLICATIONS

This application is a national stage entry according to 35 U.S.C. 371 of PCT Application No. PCT/JP2017/038732 filed on Oct. 26, 2017, which claims priority to Japanese Application No. 2016-210735 filed on Oct. 27, 2016, and Japanese Application No. 2017-057653 filed on Mar. 23, 2017, which are entirely incorporated herein by reference.

TECHNICAL FIELD

The present disclosure relates to a cell stack device, a module, and a module housing device.

BACKGROUND ART

In recent years, cell stack devices have been proposed, as next-generation energy sources, in which a plurality of fuel cells, each of which is a type of cell that can generate electrical power using a fuel gas (hydrogen-containing gas) and air (oxygen-containing gas), are arranged in a manifold. The manifold, made of metal, may be provided with a fuel gas supply pipe that is made of metal and configured to introduce a gas into an interior space of the manifold. One end of the fuel gas supply pipe may be inserted into an insertion portion provided in the manifold, and the fuel gas supply pipe and the manifold are joined together by welding or the like (see Patent Document 1: JP 2014-143162 A, for example).

SUMMARY

A cell stack device according to a non-limiting aspect of the present disclosure may include a cell stack including a plurality of cells, each of the plurality of cells having a columnar shape and internally including a gas flow passage, the plurality of cells being vertically arranged and electrically connected, a manifold configured to fix lower ends of the plurality of cells and supply a reaction gas into the gas flow passages of the plurality of cells; and a reaction gas supply pipe connected to the manifold and configured to supply the reaction gas to the manifold. The manifold and the reaction gas supply pipe may be made of metal. The manifold may include an insertion portion configured to connect the reaction gas supply pipe, a gap between the insertion portion and the reaction gas supply pipe, and a first joining portion configured to seal one end of the gap as a result of joining the insertion portion and the reaction gas supply pipe. In an arbitrarily defined cross-section along an insertion direction of the reaction gas supply pipe, the first joining portion may have a meniscus shape. A joint length, in the insertion direction, between the first joining portion and the reaction gas supply pipe may be longer than a thickness of the reaction gas supply pipe.

A module according to a non-limiting aspect of the present disclosure may include the cell stack device described above contained in a housing container.

A module housing device according to a non-limiting aspect of the present disclosure may include the module described above, an auxiliary device configured to operate the module, and an external casing containing the module and the auxiliary device therein.

DETAILED DESCRIPTION

A cell stack device, a module, and a module housing device will be described using FIGS. 1 to 12.

The cell stack device illustrated in FIGS. 1 to 12 is configured by an arrangement of a plurality of fuel cells, each of which is a type of cell, and the following description will be made using the fuel cell as a non-limiting example of the cell.

Figure 1:
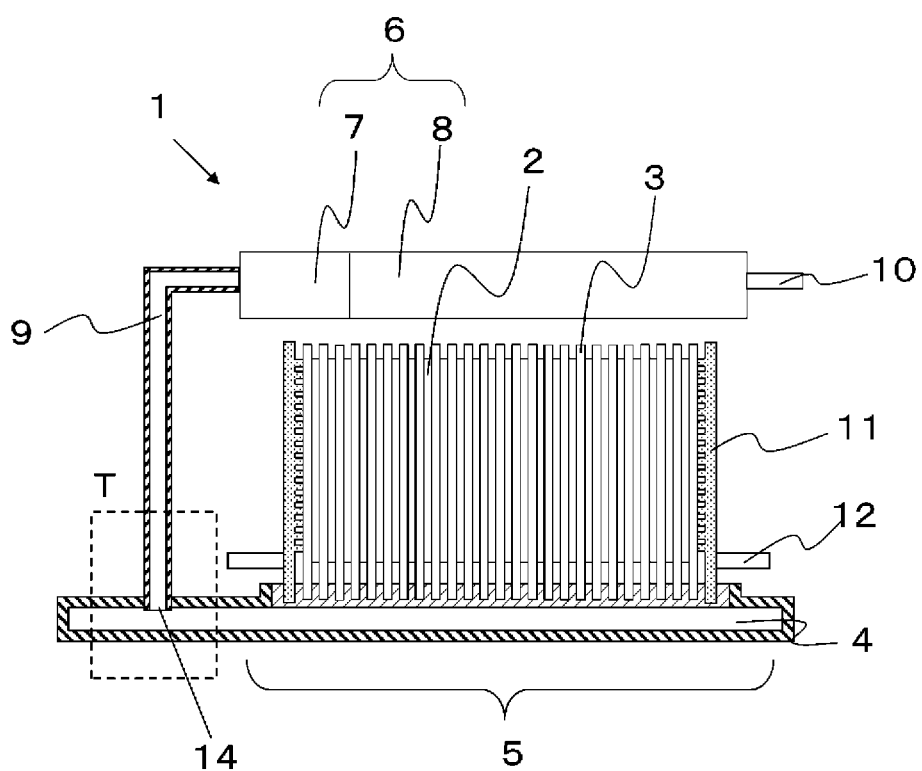
FIG. 1 is a side view and a partial cross-sectional view illustrating a non-limiting example of a cell stack device according to the present disclosure.

FIG. 1 is a side view illustrating a non-limiting example of the cell stack device according to the present disclosure with a part thereof illustrated as a cross-sectional view for ease of understanding. Note that in the subsequent drawings, the same reference numerals are used for the same components.

A cell stack device 1 illustrated in FIG. 1 includes a cell stack 2 provided with a plurality of columnar fuel cells 3. Each of the fuel cells 3 includes a gas flow passage in the interior thereof, and is configured by layering sequentially a fuel electrode layer that serves as an inner electrode layer, a solid electrolyte layer, and an air electrode layer that serves as an outer electrode layer, on one flat face of an electrically conductive support body that includes a pair of opposing flat faces and has an overall column shape and a flat cross-section. An interconnector is layered on a section of the other flat face on which the air electrode layer is not formed. Then, the fuel cells 3 are electrically connected to each other in series by interposing electrically conductive members between the fuel cells 3 adjacent to each other. Each member of the fuel cell 3 will be described later. Note that, in the following description, a description will be made using the fuel cell that includes the fuel electrode layer as the inner electrode layer and the air electrode layer as the outer electrode layer, but the fuel cell can also be configured by the air electrode layer as the inner electrode layer and the fuel electrode layer as the outer electrode layer.

Cell Stack Device

The cell stack device 1 illustrated in FIG. 1 is provided with a cell stack 5 that is configured by fixing the lower ends of the fuel cells 3 to a manifold 4 using an insulating adhesive (not illustrated), such as a glass sealing material. In the non-limiting example illustrated in FIG. 1, the manifold 4 is a box-shaped member that includes an upper wall, a lower wall, and a plurality of side walls.

At each of end portions of the cell stack 5, an electrically conductive end member 11 is disposed, which includes an electrically conductive unit 12 for collecting electricity generated by the power generation in the cell stack 5 (the fuel cells 3) and drawing the electricity to the outside.

A reformer 6 is disposed above the cell stack 5, as a gas supply source for producing a fuel gas (hereinafter sometimes simply referred to as a "gas"), which is a reaction gas supplied to the fuel cells 3. A configuration can be adopted in which the cell stack device 1 includes the reformer 6.

The reformer 6 illustrated in FIG. 1 reforms a raw fuel, such as natural gas or kerosene, supplied via a raw fuel supply pipe 10 and produces the gas. Note that the reformer 6 can have a structure that enables steam reforming, which is an efficient reformation reaction. The reformer 6 is provided with a vaporizing unit 7 configured to vaporize water, and a reforming unit 8 in which is disposed a reforming catalyst (not illustrated) for reforming the raw fuel into the gas. Then, the gas produced in the reformer 6 is supplied to the manifold 4 via a fuel gas supply pipe 9 that is a reaction gas supply pipe, and is then supplied via the manifold 4 to the gas flow passages provided inside the fuel cells 3. Note that, in a case where the fuel cell 3 that includes the air electrode layer as the inner electrode layer is used, an oxygen-containing gas supply pipe may be used as the reaction gas supply pipe.

In FIG. 1, the fuel gas supply pipe 9 and the manifold 4 are illustrated in a cross-sectional view, and the rest is illustrated in a side view.

Figure 2:
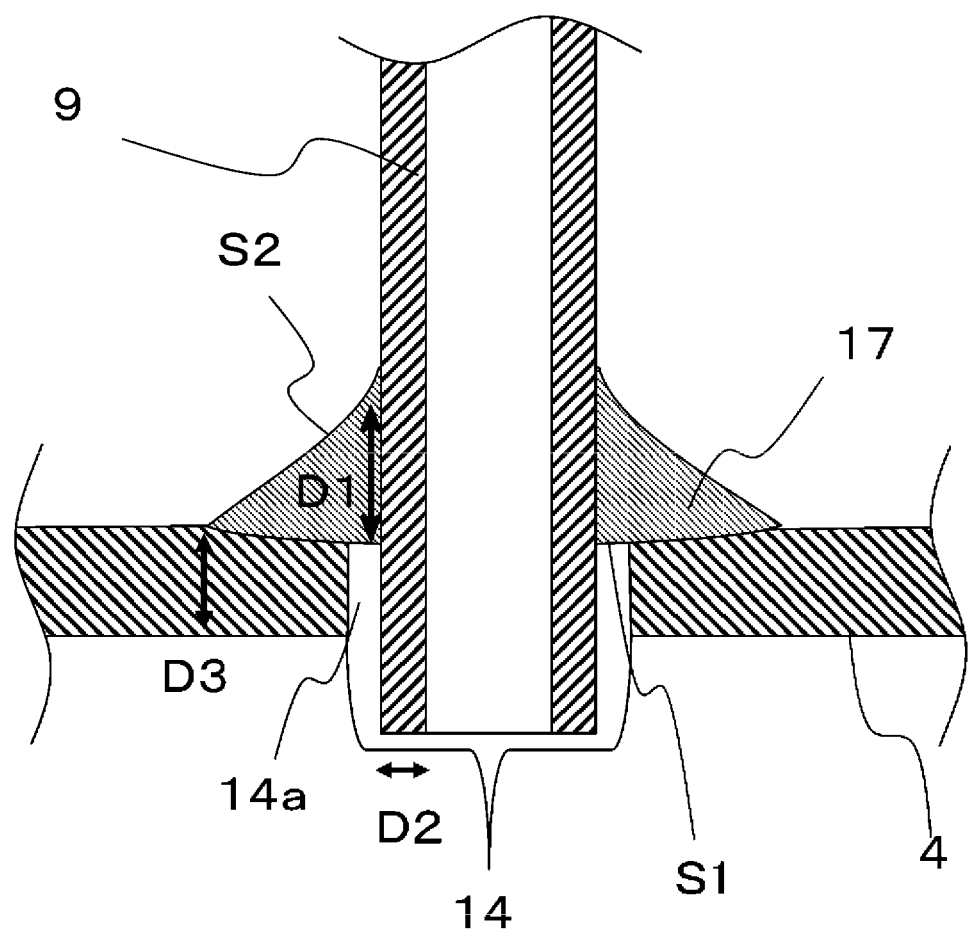
FIG. 2 is an enlarged cross-sectional view illustrating a non-limiting example of a section T of FIG. 1.

FIG. 2 is an enlarged cross-sectional view illustrating a non-limiting example of a section T of FIG. 1.

One end of the fuel gas supply pipe 9 is connected to the reformer 6, and the other end thereof is inserted into an insertion portion 14 provided in the manifold 4 and joined with the manifold 4. The manifold 4 and the fuel gas supply pipe 9 can be manufactured from a heat resistant metal such as alumina-forming stainless steel or a chromia-forming stainless steel. The insertion portion 14 is a through hole provided in the manifold 4, and although it is provided in the upper face of the manifold 4 in the non-limiting example illustrated in FIG. 2, the insertion portion 14 may be provided in either face of the manifold 4. The thickness of the fuel gas supply pipe 9 and the manifold can each be from 0.5 mm to 3 mm.

As illustrated in FIG. 2, a gap 14a is provided between the insertion portion 14 of the manifold 4 and the fuel gas supply pipe 9. In this way, the fuel gas supply pipe 9 is allowed to move more easily inside the insertion portion 14, thereby enabling stress on a first joining portion 17 (hereinafter referred to as a "first joining portion") between the fuel gas supply pipe 9 and the manifold 4 to be alleviated. As a result, the fuel gas supply pipe 9 and the manifold 4 can be strongly joined. The gap 14a may be provided over the entire circumference of the insertion portion 14 and the fuel gas supply pipe 9, or may be provided over a part of the circumference. The gap 14a can be from 0.05 mm to 1.0 mm.

As illustrated in FIG. 2, the cell stack device 1 according to a non-limiting example of the present disclosure includes the first joining portion 17 that seals one end of the gap 14a as a result of joining the insertion portion 14 and the fuel gas supply pipe 9. In an arbitrarily defined cross-section along an insertion direction of the fuel gas supply pipe 9, the first joining portion has a meniscus shape, and a joint length D1 between the first joining portion 17 and the fuel gas supply pipe 9 in the insertion direction is longer than a thickness D2 of the fuel gas supply pipe 9.

As a result, the toughness of the first joining portion 17 between the fuel gas supply pipe 9 and the manifold 4 can be maintained at a high level, and cracks in the first joining portion 17 can be inhibited. Specifically, the long-term reliability of the cell stack device 1, a module 20, and a module housing device 40 can be improved.

Note that "sealing one end of the gap" means that the one end of the gap 14a on the inner side of the manifold 4 may be sealed, or the one end of the gap 14a on the outer side of the manifold 4 may be sealed. In a case where the one end of the gap 14a on the inner side of the manifold 4 is sealed, the first joining portion 17 is provided in the interior of the manifold 4. Note that both the ends of the gap 14a may be sealed, and in this case, a surface of the first joining portion 17 exposed to a hydrogen-containing gas is referred to as a first surface S1, and a surface on the opposite side is referred to as a second surface S2.

In addition, the "first joining portion" means a region surrounded, in the arbitrarily defined cross-section along the insertion direction of the fuel gas supply pipe 9, by the first surface S1, the second surface S2, a line connecting ends of the first surface S1 and the second surface S2 on the manifold 4 side and a line connecting ends of the first surface S1 and the second surface S2 on the fuel gas supply pipe 9 side.

Figure 3:
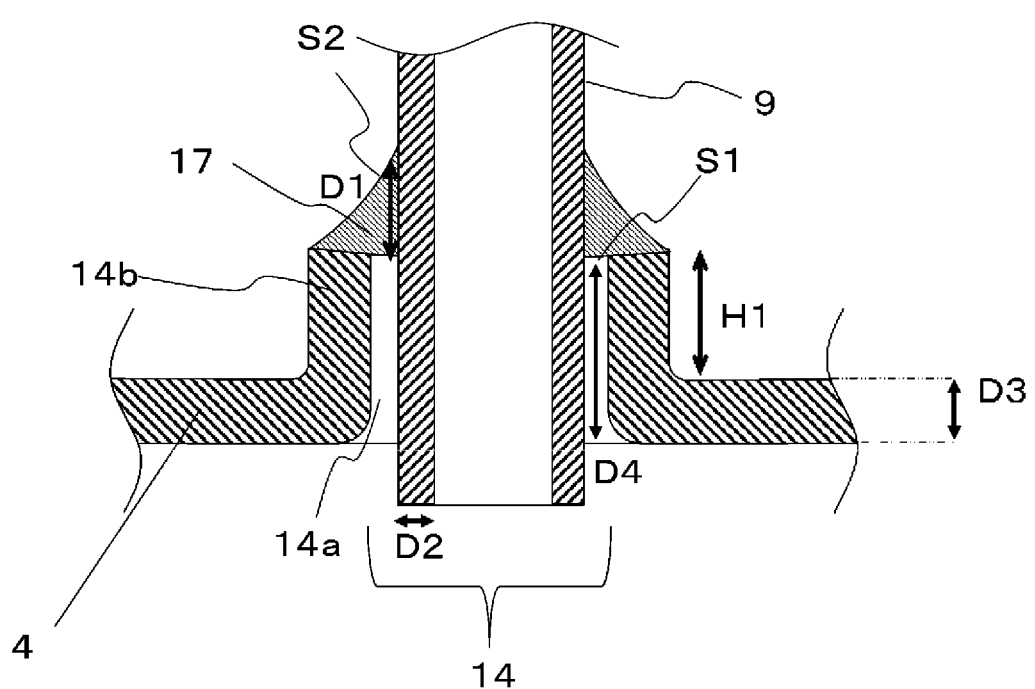
FIG. 3 is an enlarged cross-sectional view illustrating another non-limiting example of the section T of FIG. 1.

Further, the "meniscus shape" may be a concave meniscus shape as illustrated in FIGS. 2 and 3, or may be a convex meniscus shape.

Furthermore, the "thickness of the fuel gas supply pipe" D2 is a thickness of a part of the fuel gas supply pipe having the smallest thickness. However, the thickness of a part of the first joining portion 9 that is in contact with the first joining portion 17 is excluded.

Here, the second surface S2 may be formed as a part in which a structure of a crystal close to the surface is a dendritic structure, or may be formed as a part that has a different material composition from each of the manifold 4 and the fuel gas supply pipe 9.

Further, the joint length D1 may be shorter than double the thickness of the fuel gas supply pipe 9. In this way, the manifold 4 and the fuel gas supply pipe 9 is joined via the first joining portion 17 more strongly than necessary, and the freedom of movement of the first joining portion 17 is reduced; as a result, a concentration of the stress on the first joining portion 17 can be inhibited.

In addition, in the arbitrarily defined cross-section along the insertion direction of the fuel gas supply pipe 9, the joint length D1 in the insertion direction may be longer than a thickness D3 of the manifold 4. As a result of this, even when the manifold 4 is vibrated in the insertion direction of the fuel gas supply pipe 9, cracks can be inhibited from occurring in the vicinity of a joint interface between the first joining portion 17 and the fuel gas supply pipe 9.

Note that the "thickness of the manifold" D3 is a thickness of a part having the smallest thickness of the wall of the manifold 4 in which the insertion portion 14 is provided, but the thickness of a part of the manifold 4 that is in contact with the first joining portion 17 is excluded.

FIG. 3 is an enlarged cross-sectional view illustrating another non-limiting example of the section T of FIG. 1.

In the non-limiting example illustrated in FIG. 3, a length D4 of the gap 14a in the insertion direction of the fuel gas supply pipe 9 is longer than the thickness D3 of the manifold 4. As a result of this, in comparison with a case in which the length D4 of the gap 14a is shorter than the thickness D3 of the manifold 4, an amount of the gas blown against the first surface S1 that is in contact with the gap 14a can be reduced. Specifically, hydrogen embrittlement of the first surface S1 can be inhibited.

The non-limiting example illustrated in FIG. 3 can be realized by providing a first bent portion 14b, which extends toward the reformer 6 side along the fuel gas supply pipe 9, around a peripheral edge of the insertion portion 14 on the outer side of the manifold 4. By including the first bent portion 14b, the manifold 4 and the fuel gas supply pipe 9 are more easily joined, and the fuel gas supply pipe 9 is also more easily inserted into the insertion portion 14. Note that a height H1 of the first bent portion 14b can be from 2 mm to 5 mm, for example.

In addition, an annular member, which extends toward the reformer 6 side along the fuel gas supply pipe 9, may separately be provided around an outer periphery of the insertion portion 14. As another non-limiting example, the bent portion or the annular member may be provided around the peripheral edge of the insertion portion on the inner side of the manifold.

In the non-limiting example illustrated in FIG. 3, the first joining portion 17 is provided on a leading end of the first bent portion 14b, and the first bent portion 14b and the fuel gas supply pipe 9 are joined via the first joining portion 17. Meanwhile, as another non-limiting example, the first joining portion 17 may be provided on the first bent portion 14b on the manifold 4 side.

Figure 4:
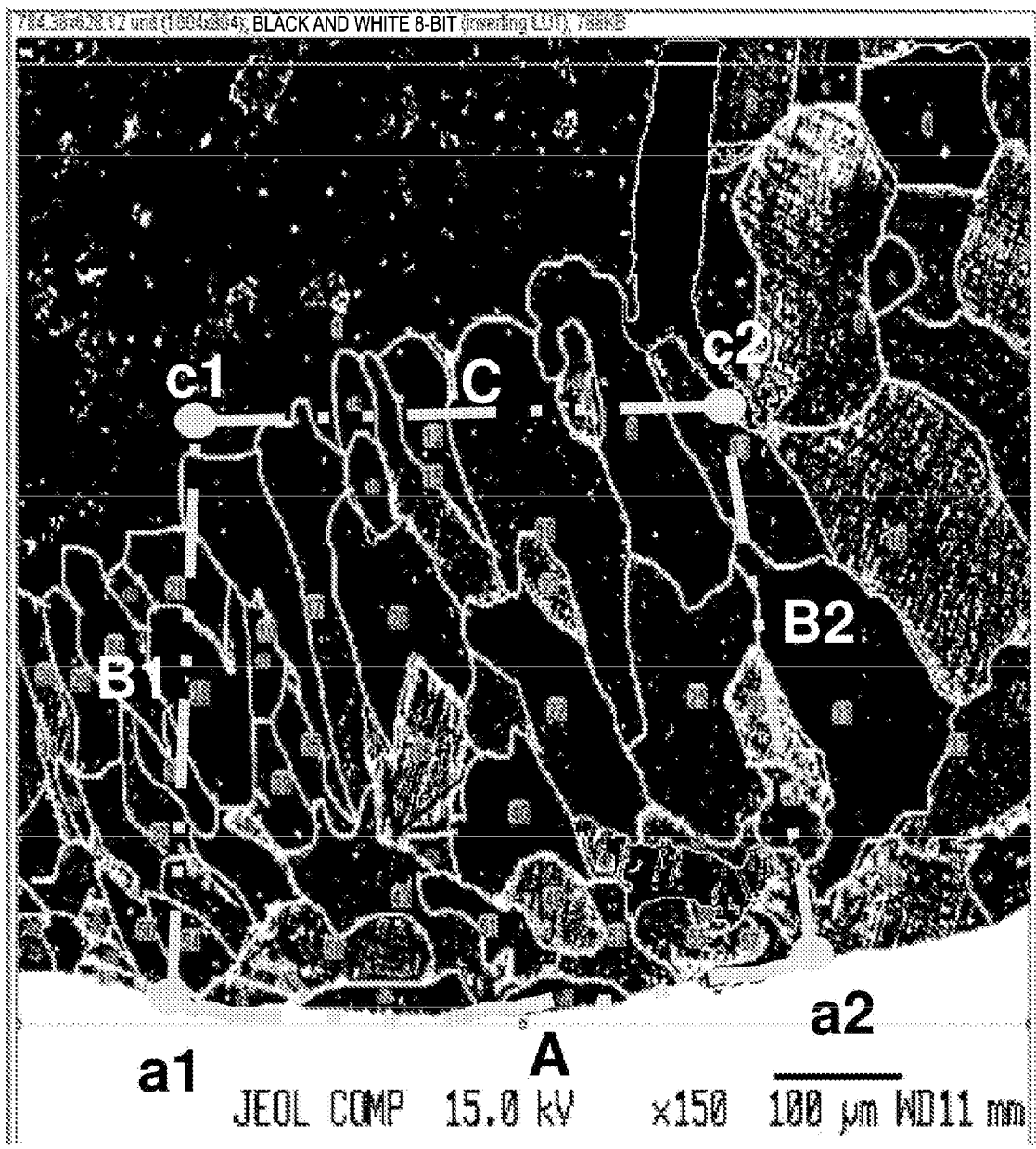
FIG. 4 is a SEM photograph of a connecting portion in FIG. 1.

FIG. 4 is a scanning electron microscope (SEM) photograph of a cross-section near the surface of the first joining portion 17. Note that, FIG. 4 illustrates a state of a result obtained by measuring crystal areas to be described below.

As illustrated in FIG. 4, in the arbitrarily defined cross-section along the insertion direction of the fuel gas supply pipe 9, an average crystal area of the first joining portion 17 can be 10000 $\mu m^2$ or less with respect to crystals present in a region (hereinafter referred to as an "analysis region") that is surrounded by a portion of an analysis surface A having a length of 500 $\mu m$ in the first joining portion 17, two vertical lines B1 and B2 each having a length of 500 $\mu m$ and having respective start points a1 and a2 at both ends of the analysis surface A, and a line C joining two end points c1 and c2 of the vertical lines. In this way, the strength of the first joining portion 17 can be increased. Further, in order to further increase the strength of the first joining portion 17, the average crystal area may be 4000 $\mu m^2$ or less. Further, of the crystals in the analysis region of the first joining portion 17, the crystal area of all of the crystals (of each individual crystal), may be 40000 $\mu m^2$ or less. Note that " . . . crystals present in a region that is surrounded by" does not only refer to the crystals entirely included in the analysis region, but also refers to the crystals that are partially included in the analysis region.

Further, as illustrated in FIG. 4, in the region of the first joining portion 17, the average crystal area of the crystals positioned on the analysis surface A, of the first joining portion 17, having the length of 500 $\mu m$ can be 5000 $\mu m^2$ or less. In this way, since the strength can be increased in the vicinity of the second surface in which cracks easily occur, the strength of the first joining portion 17 can be further increased.

A method will be described for identifying the crystal area of the crystals in a cross-section of the first joining portion 17. Firstly, the scanning electron microscope is used to obtain a channeling contrast image in a cross section of the first joining portion 17 that includes the second surface. Next, the crystals appearing in the obtained channeling contrast image are identified. Lastly, of the identified crystals, the crystal areas of the crystals surrounded by the above-described analysis region are identified using an image analysis method or the like.

A non-limiting example of a method for manufacturing the above-described manifold 4 according to the present disclosure will be described next.

The first joining portion 17 that joins the fuel gas supply pipe 9 and the manifold 4 can be provided by joining the manifold 4 and the fuel gas supply pipe 9 using a metallurgical joining method. The metallurgical joining methods are methods to perform joining through fusion welding, pressure welding, or soldering. Non-limiting examples of the fusion welding include laser welding, plasma arc welding, inert gas arc welding, MAG welding, gas welding, or the like. Further, non-limiting examples of the pressure welding include ultrasonic welding, friction welding, explosive welding, or the like.

Adjustment of the joint length D1 between the first joining portion 17 and the fuel gas supply pipe 9, in the arbitrarily defined cross-section of the first joining portion 17 along the insertion direction of the fuel gas supply pipe 9, and adjustment of the crystal area of the crystals of the second surface of the first joining portion 17 can be realized by adjusting, as appropriate, various conditions of the joining method of the metallurgical joining methods. For example, in a case where the first joining portion 17 is provided by welding, the adjustments can be realized by adjusting an irradiation angle and an irradiation output of a heat source.

Figure 5:
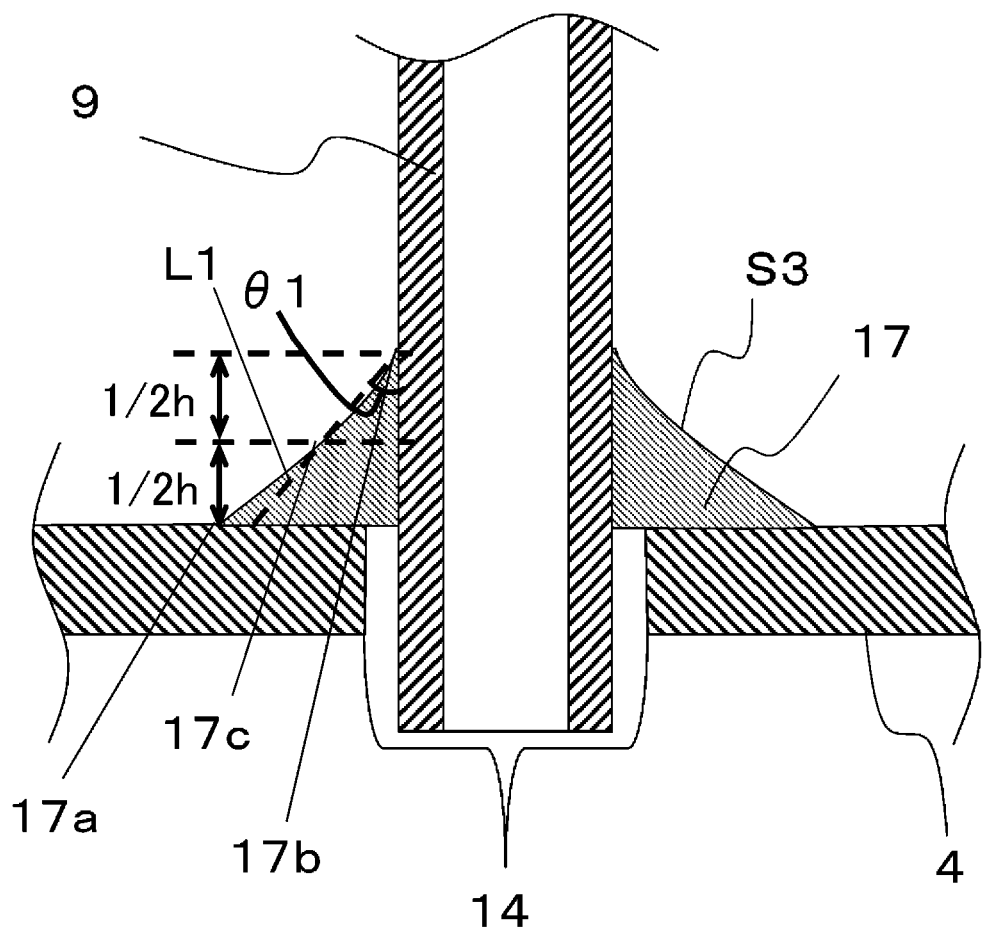
FIG. 5 is an enlarged cross-sectional view illustrating a non-limiting example of the section T of FIG. 1.

FIG. 5 is an enlarged cross-sectional view illustrating a non-limiting example of the section T of FIG. 1. In the present non-limiting example, an angle θ1 of the first joining portion 17 can be 30° or less. In this way, even if the fuel gas supply pipe 9 is deformed or moves, stress acting on the first joining portion 17, particularly stress acting on a first leading end portion 17b, can be alleviated, and the reliability of the joint between the fuel gas supply pipe 9 and the manifold 4 can be improved.

Here, as illustrated in FIG. 5, in the arbitrarily defined cross-section in the insertion direction of the fuel gas supply pipe 9, the angle θ1 is an angle formed between a vertical line drawn from the first leading end portion 17b of the first joining portion 17 toward the manifold 4, and a first straight line L1 joining a first point 17c and the first leading end portion 17b, the first point 17c being in a first contour line S3 of the first joining portion 17 and positioned at a height that is half of a height from a first bottom portion 17a to the first leading end portion 17b of the first joining portion 17.

Further, in the course of further suppressing damage and the like to the first joining portion 17, a shape can be adopted in which the angle θ1 is 20° or less.

Further, the first joining portion 17 can be a concave meniscus shape, or a linear shape. In this way, it is possible to inhibit the stress acting on the first joining portion 17 from concentrating on a single point, and the stress acting on the first joining portion 17 can be alleviated.

Figure 6:
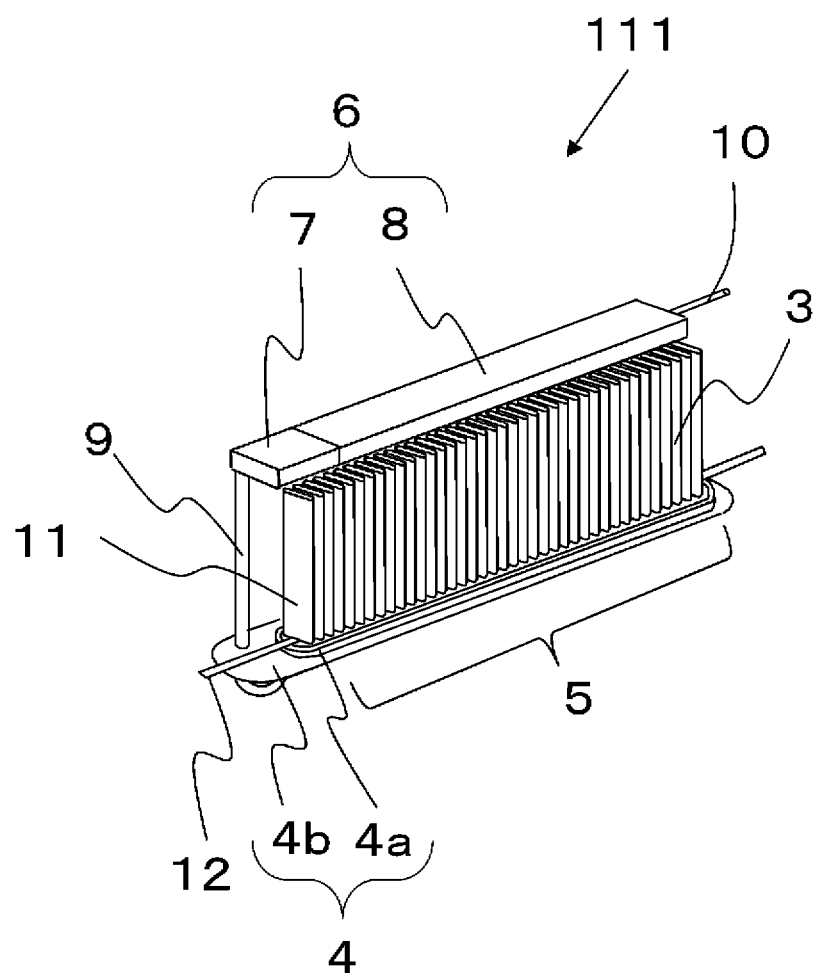
FIG. 6 is an external perspective view illustrating another non-limiting example of the cell stack device according the present disclosure.
Figure 7:
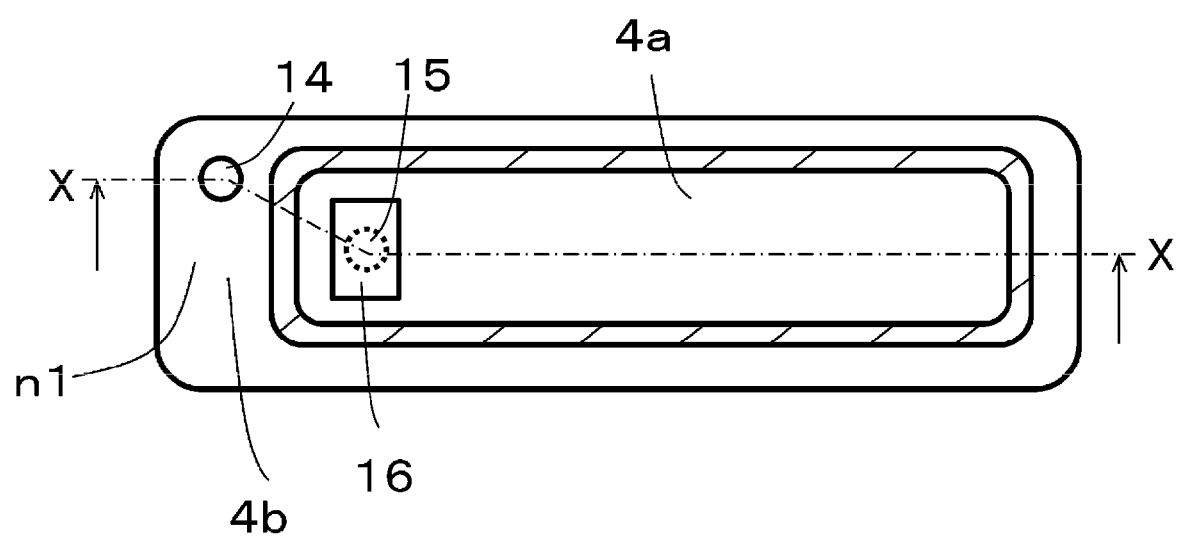
FIG. 7 is a plan view of the cell stack device illustrated in FIG. 6 with a part thereof not illustrated.

FIG. 6 is an external perspective view illustrating another non-limiting example of the cell stack device according to the present disclosure, and FIG. 7 is a plan view of the cell stack device illustrated in FIG. 6 with a part thereof not illustrated. Further, FIG. 8 is a cross-sectional view of the fuel gas supply pipe 9, the manifold 4, and a straightening plate 16 taken along a line X-X in FIG. 7, and other members are illustrated in a side view.

Figure 8:
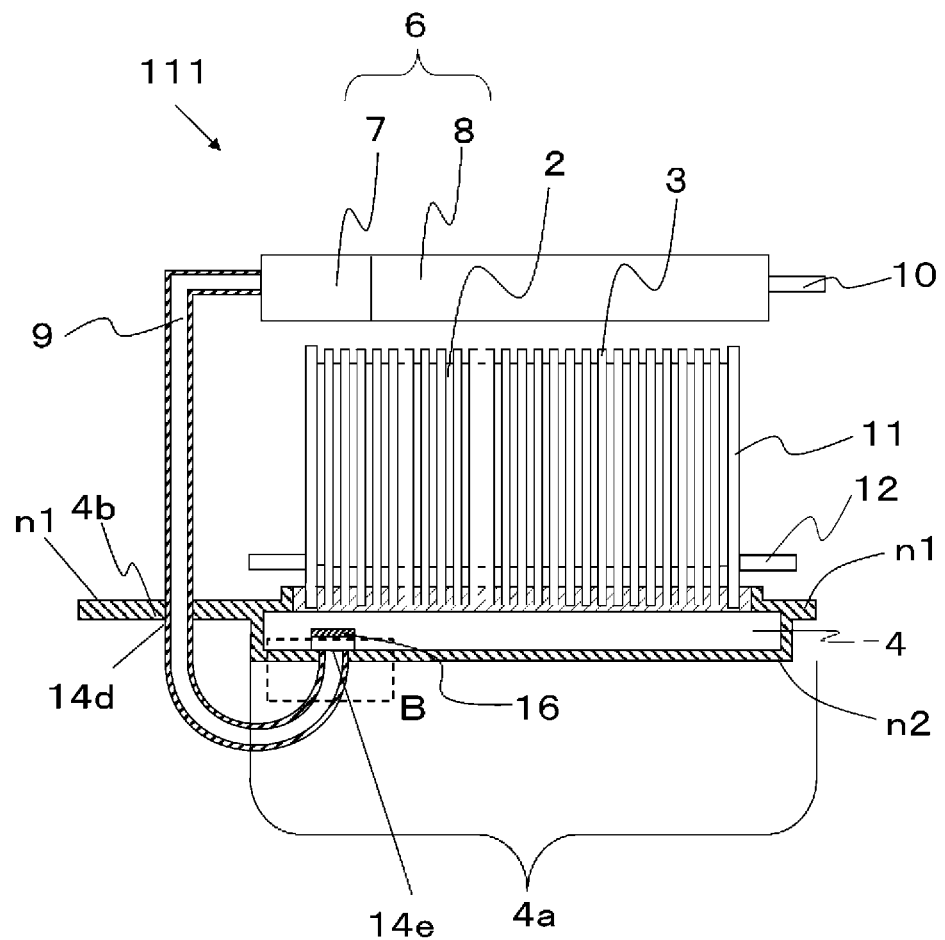
FIG. 8 is a cross-sectional view taken along a line X-X in FIG. 7 with a part thereof illustrated in a side view.

The manifold 4 of a cell stack device 111 illustrated in FIG. 6 to FIG. 8 includes a main body portion 4a including a space that is communicated with the gas flow passages, and a flange portion 4b that protrudes from the main body portion 4a. The gas is supplied to the fuel cells 3 via the space in the main body portion 4a. The other end of the fuel gas supply pipe 9 is joined to the manifold 4 by being inserted from the side of a first face n1 into a first through hole 14d, which is the insertion portion 14, configured to penetrate through the flange portion 4b. Further, the other end of the fuel gas supply pipe 9 is joined to the manifold 4 by being inserted from the side of a second face n2 into the second through hole 14e, which is the insertion portion 14, configured to penetrate through the main body portion 4a. Then, the manifold 4 includes the straightening plate 16 that is separated from the other end of the fuel gas supply pipe 9 and covers the other end. In other words, in order to improve a flow distribution ratio, the straightening plate 16 is provided perpendicularly to a flow-out direction of gas flowing out from the second through hole 14e. Further, the straightening plate 16 includes an opening portion. The opening portion may be provided such that the gas flows toward the fuel cell 3 at the end of the cell stack 5 that is separated from the straightening plate 16. Note that, of the first face n1 and the second face n2, in the manifold 4, the surface on the side on which the cell stack 5 is joined and mounted is the first face n1, and the surface on the opposite side to the first face n1 is the second face n2.

Note that, since the joining (the first joining portion) of the first through hole 14d and the fuel gas supply pipe 9 can adopt the above-described configuration illustrated in FIG. 2 to FIG. 5, an explanation is omitted, and hereinafter, the joining of the fuel gas supply pipe 9 to the second through hole 14e will be described.

Figure 9:
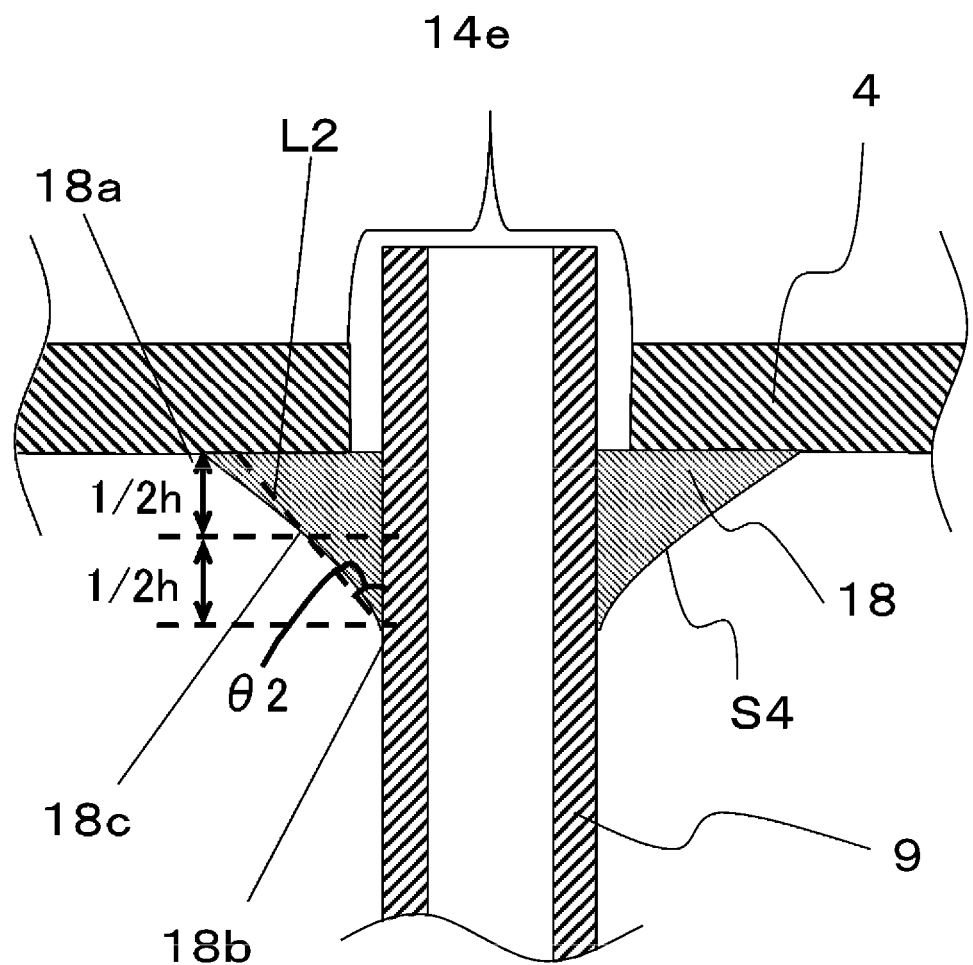
FIG. 9 is an enlarged cross-sectional view illustrating a non-limiting example of a section B of FIG. 8.

FIG. 9 is an enlarged cross-sectional view illustrating a non-limiting example of a section B of FIG. 8. In the present non-limiting example, the other end of the fuel gas supply pipe 9 and the manifold 4 are joined via a second joining portion 18. Here, in the present non-limiting example, an angle θ2 of the second joining portion 18 can be 30° or less. In this way, even if the fuel gas supply pipe 9 is deformed or moves, stress acting on the second joining portion 18, particularly stress acting on a second leading end portion 18b, can be alleviated, and the reliability of the joint between the fuel gas supply pipe 9 and the manifold 4 can be improved.

Here, in the arbitrarily defined cross-section in the insertion direction of the fuel gas supply pipe 9, the angle θ2 is an angle formed between a vertical line drawn from the second leading end portion 18b of the second joining portion 18 toward the manifold 4, and a second straight line L2 joining a second point 18c and the second leading end portion 18b, the second point 18c being in a second contour line S4 of the second joining portion 18 and positioned at a height that is half of a height from a second bottom portion 18a to the second leading end portion 18b of the second joining portion 18.

Further, in the course of further suppressing damage and the like to the second joining portion 18, a shape can be adopted in which the angle θ2 is 20° or less.

As illustrated in FIG. 9, the second joining portion 18 can be the concave meniscus shape, or the linear shape. In this way, it is possible to inhibit the stress acting on the second joining portion 18 from concentrating on a single point, and the stress acting on the second joining portion 18 can be alleviated.

Figure 10:
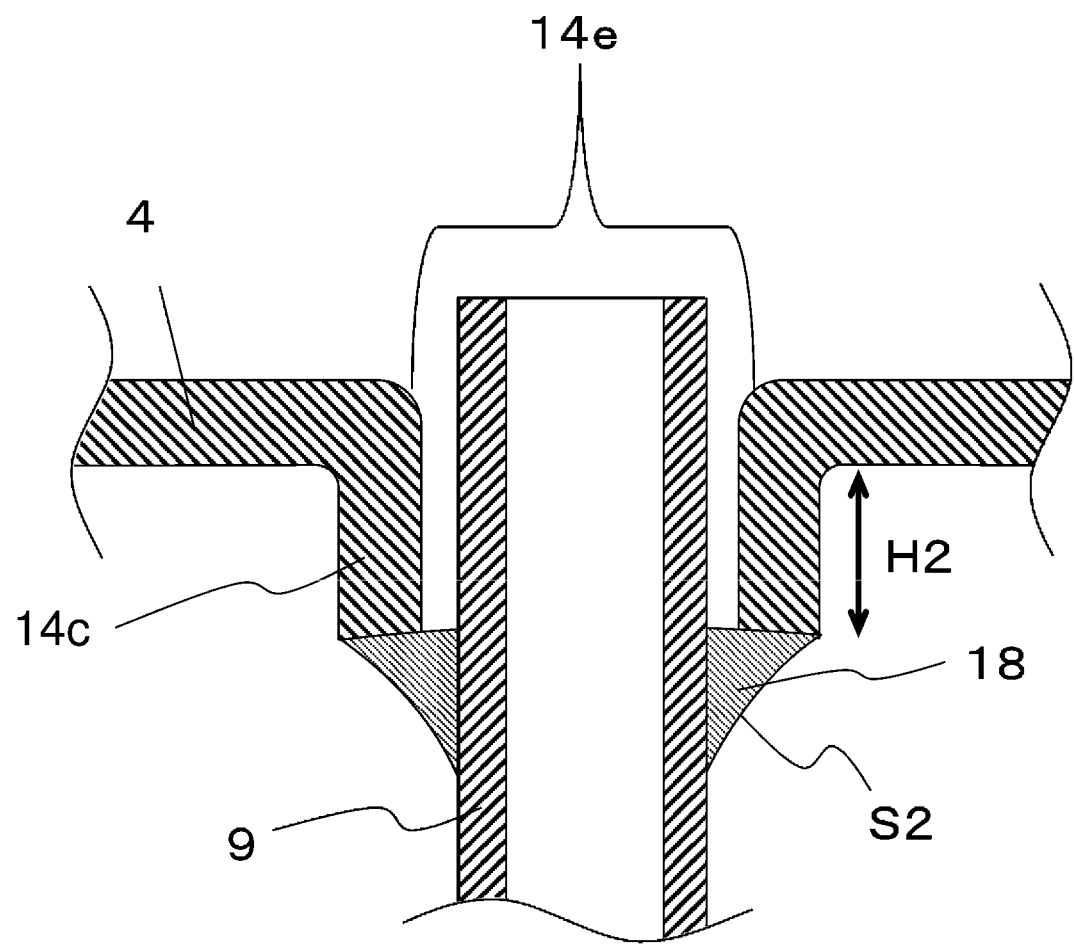
FIG. 10 is an enlarged cross-sectional view illustrating another non-limiting example of the section B of FIG. 8.

FIG. 10 is an enlarged cross-sectional view illustrating another non-limiting example of the section B of FIG. 8.

In a non-limiting example illustrated in FIG. 10, a second bent portion 14c is provided which extends toward the reformer 6 along the fuel gas supply pipe 9, around an outer periphery of the second through hole 14e in the manifold 4, and an upper end portion of the second bent portion 14c and the fuel gas supply pipe 9 are joined via the second joining portion 18. In this way, since the manifold 4 includes the second bent portion 14c, the joining of the manifold 4 and the fuel gas supply pipe 9 becomes easier, and moreover, the fuel gas supply pipe 9 is more easily inserted into the second through hole 14e. Note that a height H2 of the second bent portion 14c can be from 2 mm to 5 mm, for example.

A non-limiting example of a method for manufacturing the above-described manifold 4 according to the present disclosure will be described. As illustrated in FIG. 8, for example, manufacturing methods will be described below in detail of the manifold 4 in which the first through hole 14d is formed in the flange portion 4b, and the second through hole 14e is formed in the main body portion 4a.

The first through hole 14d is formed by penetrating the flange portion 4b through a processing method, such as a punching process. Similarly, the second through hole 14e is formed by penetrating the main body portion 4a through a processing method, such as the punching process.

The first joining portion 17 and the second joining portion 18 to which the fuel gas supply pipe 9 and the manifold 4 are joined can be provided by joining an outer surface of the manifold 4 and the fuel gas supply pipe 9 using a metallurgical joining method. The metallurgical joining methods are the methods to perform joining through the fusion welding, the pressure welding, or the soldering. Non-limiting examples of the fusion welding include the laser welding, the plasma arc welding, the inert gas arc welding, the MAG welding, the gas welding, or the like. Further, non-limiting examples of the pressure welding include the ultrasonic welding, the friction welding, the explosive welding, or the like.

Further, in the manifold 4, in order to provide the first bent portion 14b and the second bent portion 14c formed integrally with the outer peripheries of a first through hole 14d and the second through hole 14e, respectively, the first bent portion 14b and the second bent portion 14c can be manufactured by a processing method such as the pressing process using dies having the shapes of the first bent portion 14b and the second bent portion 14c. Further, in a case where the first bent portion 14b and the second bent portion 14c are provided separately from the outer peripheries of the first through hole 14d and the second through hole 14e, respectively, members having the shapes of the first bent portion 14b and the second bent portion 14c may be prepared, and the respective members may be joined to the outer peripheries of the first through hole 14d and the second through hole 14e using the above-described metallurgical joining method.

Cell

A well-known general material may be used for the fuel electrode layer. For example, the fuel electrode layer can be formed of a porous electrically conductive ceramic, such as $ZrO_2$ solid solution with a rare earth element oxide (referred to as a stabilized zirconia that also includes partially stabilized zirconia), and at least one of Ni and NiO.

The solid electrolyte layer functions as an electrolyte that allows electron transfer between the electrodes, and has a gas blocking property that prevents leaks of the fuel gas and the oxygen-containing gas. The solid electrolyte layer is formed of $ZrO_2$ solid solution containing 3 to 15 mol % of the rare earth element oxide. Note that the solid electrolyte layer may be formed from another material as long as that material exhibits the above-described properties.

The material for an oxygen electrode layer is not particularly limited, and any well-known general material may be used. For example, the oxygen electrode layer can be formed of an electrically conductive ceramic made from a so-called $ABO_3$ perovskite oxide. The oxygen electrode layer is gas permeable, and the open porosity thereof is in a range of 20% or more, and particularly in a range from 30 to 50%.

The interconnector can be formed from an electrically conductive ceramic, but since the interconnector comes contact with the fuel gas (the hydrogen-containing gas) and the oxygen-containing gas (air or the like), a lanthanum chromite perovskite oxide ($LaCrO_3$ based oxide) that is reduction resistant and oxidation resistant can be used. In order to prevent leaks of the fuel gas flowing through gas flow passages formed by the support body and the oxygen-containing gas flowing on the outer side of the fuel cells 3, the interconnector is dense and has a relative density of 93% or greater, and particularly 95% or greater.

The support body is gas permeable to allow the fuel gas to permeate therethrough and arrive at the fuel electrode layer, and further, is electrically conductive to allow current collection via the interconnector. Thus, a material that satisfies these requirements, such as an electrically conductive ceramic or cermet can be used as the support body.

Moreover, in each of the fuel cells 3 illustrated in FIG. 1, the column-shaped support body is an elongated plate that extends in the erecting direction of the fuel cells 3, and has a shape of a hollow flat plate that includes a pair of opposing flat surfaces and two semicircular side surfaces. Then, lower end portions of the fuel cells 3 and a lower end portion of the above-described electrically conductive member are fixed to the manifold 4 that supplies the fuel gas to the fuel cells 3, by the insulating adhesive, such as the glass sealing material, and the gas flow passages provided in the support body communicate with a fuel gas chamber inside the manifold 4.

During the manufacture of the fuel cells 3, in a case where the support body is manufactured by simultaneously sintering with the fuel electrode layer or the solid electrolyte layer, the support body can be made from an iron group metal, such as Ni, and a specific rare earth oxide, such as $Y_2O_3$. In addition, to ensure the fuel gas permeability, the support body has an open porosity of 20% or more, and particularly in a range from 25 to 50%. The support body also has an electrical conductivity of 300 S/cm or more, and particularly 440 S/cm or more.

Here, in the fuel cell 3, a portion in which the fuel electrode layer and the oxygen electrode layer face each other via the solid electrolyte layer functions as a power generating element. That is, the oxygen-containing gas, such as air, flows outside the oxygen electrode layer and the fuel gas (the hydrogen-containing gas) flows in the gas flow passages inside the support body, and the gases are heated to a predetermined actuation temperature, generating power as a result. Then, current generated by this power generation is collected by the above-described electrically conductive member, via the interconnector disposed on the support body.

Module

Figure 11:
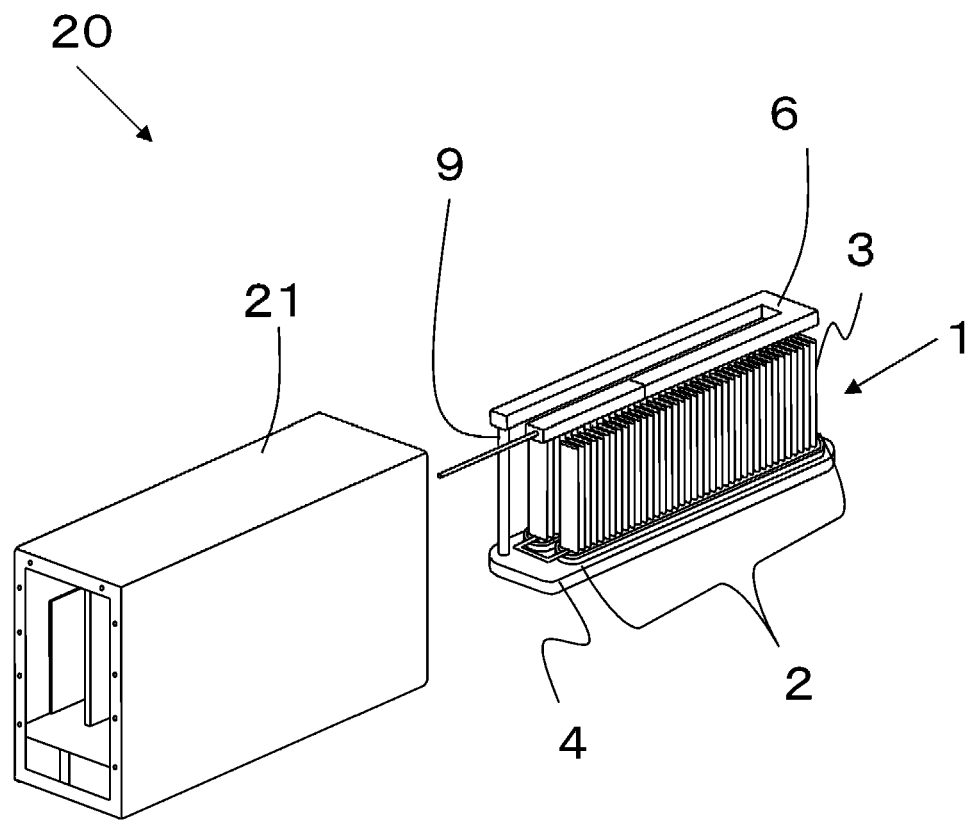
FIG. 11 is an external perspective view illustrating a non-limiting example of a module according to the present disclosure.

FIG. 11 is an external perspective view illustrating, in an exploded manner, the module 20 configured by the cell stack illustrated in FIG. 1 being contained inside a housing container. The module 20 is configured by the cell stack device 1 illustrated in FIG. 1 being contained inside a rectangular cuboid-shaped housing container 21.

Here, FIG. 11 illustrates a state in which parts (front and back faces) of the housing container 21 are detached and the cell stack device 1 and the reformer 6 contained inside have been removed to the rear. In the module 20 illustrated in FIG. 11, the cell stack device 1 can be contained in the housing container 21 by being slid thereinto.

Furthermore, in the module 20 of the present non-limiting example, since the above-described cell stack device 1 is contained in the housing container 21, the module 20 with improved durability can be obtained.

Module Housing Device

Figure 12:
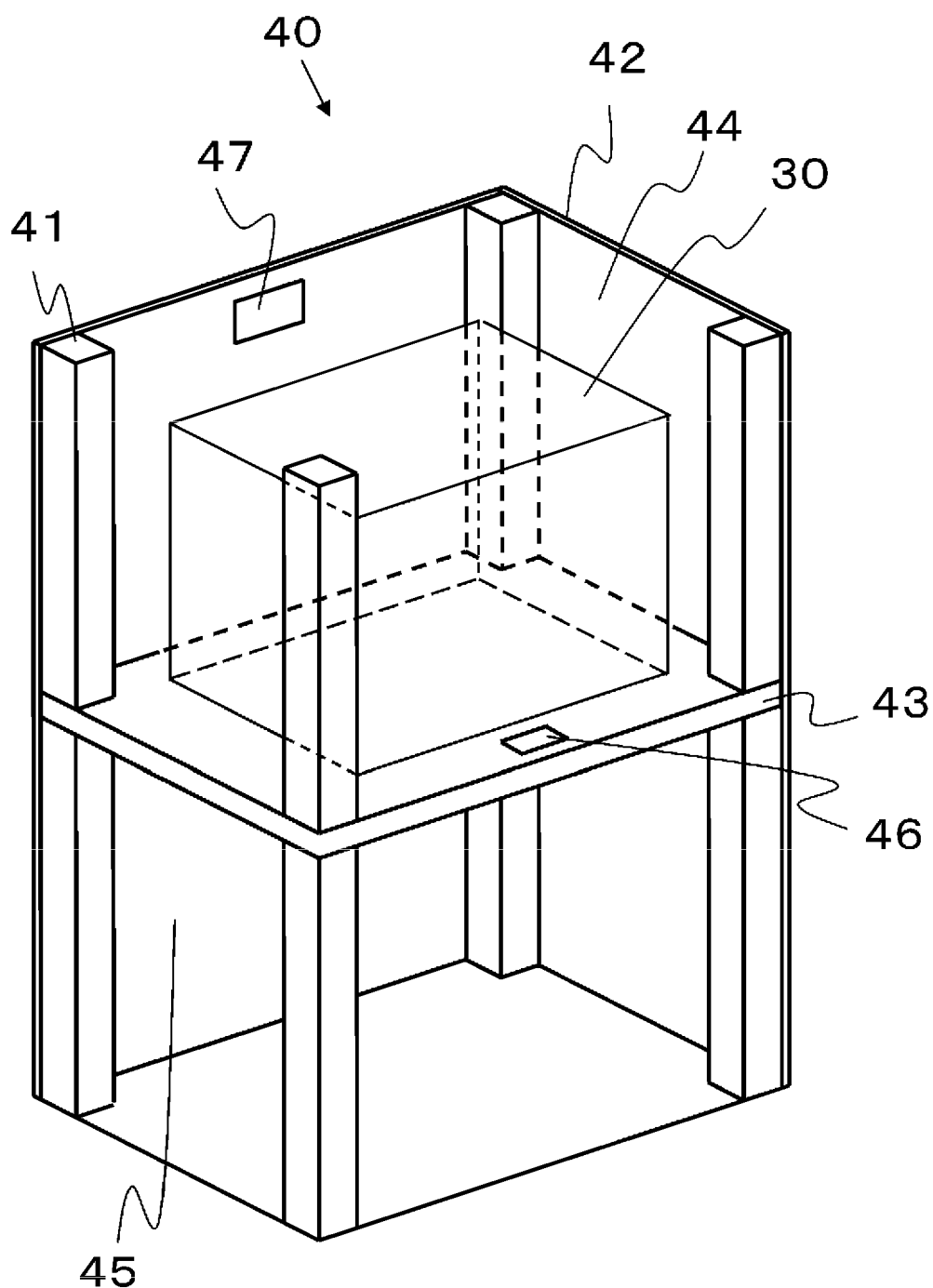
FIG. 12 is a perspective view illustrating a non-limiting example of a module housing device according to the present disclosure with a part thereof not illustrated.

FIG. 12 is a perspective view illustrating a non-limiting example of a fuel cell device that is the module housing device 40 in which the module 20 illustrated in FIG. 11 and an auxiliary device configured to operate the cell stack device 1 are contained inside an external casing. Note that a part of the configuration is omitted in FIG. 12.

In the module housing device 40 illustrated in FIG. 12, the external casing configured by supports 41 and exterior plates 42 is divided into an upper side and a lower side by a dividing plate 43. The upper side forms a module housing chamber 44 that contains the above-described module 20, and the lower side forms an auxiliary device housing chamber 45 that contains the auxiliary device configured to operate the module 20. Note that the auxiliary device contained in the auxiliary device housing chamber 45 is not illustrated.

Furthermore, an airflow hole 46 is formed in the dividing plate 43. The air flow hole 46 allows air in the auxiliary device housing chamber 45 to flow into the module housing chamber 44. An exhaust hole 47 is formed in a part of the outer plates 42 that configure the module housing chamber 44. Air inside the module housing chamber 44 is discharged through the exhaust hole 47.

In the module housing device 40, as described above, by configuring the module 20 having improved durability to be contained in the module housing chamber 44, it is possible to obtain the module housing device 40 having improved durability.

The present disclosure is not limited to the above-described non-limiting examples, and various modifications can be made without departing from the scope of the present disclosure. For example, in the above-described non-limiting examples, the explanation is made using so-called "vertical cells". However, horizontal cells referred to commonly as "horizontal cells", in which a plurality of power generating elements are formed on a support substrate, or so-called cylindrical cells may also be used.

Furthermore, the fuel cells 3, the cell stack device 1, the module 20, and the module housing device 40 are described in the above-described non-limiting examples. However, the present disclosure can also be applied to electrolytic cells (SOEC) that generate hydrogen and oxygen ($O_2$) as a result of electrolyzing water vapor (water) by applying water vapor and voltage to a cell, an electrolytic cell stack device and an electrolytic module that are provided with the electrolytic cells, and an electrolytic device that is a module housing device.

EXAMPLE 1

Manufacture of Samples

According to the above-described methods for the above-described cell stack device, the manifold and the fuel gas supply pipe were welded using the laser welding method, and samples shown in Tables 1 to 4 were manufactured.

The various members of the cell stack device were the same as those illustrated in FIG. 1. Note that, in the present non-limiting example, the cell stack device included the reformer. The thickness of the fuel gas supply pipe was 0.9 mm. Then, the samples having different joint lengths between the first joining portion and the fuel gas supply pipe, or different crystal areas of the crystals in the vicinity of the second surface of the first joining portion were manufactured.

Durability Test

Hydrogen-containing gas was caused to flow through the gas flow passages of the fuel cells of the cell stack device, and further, air was caused to flow on the outer side of the fuel cells (on the outer face of the air electrode layer). Then, power was generated for 24 hours at 850° C. After that, the hydrogen-containing gas was stopped and the cell stack device was naturally cooled. The above procedure was repeatedly performed up to a predetermined number of repetitions, the test was stopped, and the presence or absence of cracks was verified. The results are shown in Tables 1 to 4.

Note that further testing was not performed on stack devices in which cracks had occurred at the time of verification.

The test results are shown in Tables 1 to 4. Note that, in Tables 1 to 4, the joint length between the first joining portion and the fuel gas supply pipe, an average crystal area value, a maximum crystal area value, a value of the average crystal area of the crystals positioned on the surface of the first joining portion, and a number of cycles of a thermal cycling test are listed.

TABLE 1

| Sample No. | Joint length (mm) | Average crystal area value ($\mu m^2$) | Maximum crystal area value ($\mu m^2$) | Average crystal area value at surface ($\mu m^2$) | Presence/Absence of cracks after thermal cycling test | |
|---|---|---|---|---|---|---|
| | | | | | 400 cycles | 420 cycles |
| 1 | 0.8 | 9120 | 30035 | 1928 | Present | — |
| 2 | 0.9 | 8921 | 30101 | 1978 | Present | — |
| 3 | 1.0 | 9003 | 28781 | 1911 | Absent | Absent |
| 4 | 1.4 | 8992 | 34252 | 1942 | Absent | Absent |
| 5 | 1.7 | 9187 | 30994 | 1997 | Absent | Absent |
| 6 | 1.8 | 9091 | 28222 | 1978 | Absent | Present |
| 7 | 2.2 | 8934 | 29716 | 1954 | Absent | Present |

Durability Test Result 1

For sample No. 1 with the joint length of 0.8 mm and Sample No. 2 with the joint length of 0.9 mm, cracks occurred in the first joining portions in the thermal cycling test of 400 cycles. However, for Samples No. 3 to 7 with the joint lengths of 1.0 mm or greater, cracks did not occur in the first joining portions in the thermal cycling test of 400 cycles.

For Samples No. 6 and 7 with the joint lengths of 1.8 mm or greater, cracks occurred in the first joining portions in the thermal cycling test of 420 cycles. However, for Samples No. 3 to 5 with the joint lengths of 1.0 mm to 1.7 mm, cracks did not occur in the first joining portions in the thermal cycling test of 420 cycles.

TABLE 2

| Sample No. | Joint length (mm) | Average crystal area value ($\mu m^2$) | Maximum crystal area value ($\mu m^2$) | Average crystal area value at surface ($\mu m^2$) | Presence/Absence of cracks after thermal cycling test | |
|---|---|---|---|---|---|---|
| | | | | | 440 cycles | 460 cycles |
| 1 | 1.4 | 13119 | 30118 | 1979 | Present | — |
| 2 | 1.4 | 11021 | 30381 | 1965 | Present | — |
| 3 | 1.4 | 10000 | 31003 | 1999 | Absent | Present |
| 4 | 1.4 | 8110 | 32411 | 1921 | Absent | Present |
| 5 | 1.4 | 6208 | 29931 | 1896 | Absent | Present |
| 6 | 1.4 | 4000 | 28251 | 1991 | Absent | Absent |
| 7 | 1.4 | 3107 | 30004 | 1936 | Absent | Absent |

Durability Test Result 2

For Sample No. 1 with the average crystal area value of 13119 $\mu m^2$ and Sample No. 2 with the average crystal area value of 11021 $\mu m^2$, cracks occurred in the first joining portions in the thermal cycling test of 440 cycles. However, for Samples No. 3 to 7 with the average crystal area values of 10000 $\mu m^2$ or less, cracks did not occur in the first joining portions in the thermal cycling test of 440 cycles.

For Samples 3 to 5 with the average crystal area values greater than 4000 $\mu m^2$, cracks occurred in the first joining portions in the thermal cycling test of 460 cycles. However, for Samples No. 6 and 7 with the average crystal area values of 4000 $\mu m^2$ or less, cracks did not occur in the first joining portions in the thermal cycling test of 460 cycles.

TABLE 3

| Sample No. | Joint length (mm) | Average crystal area value ($\mu m^2$) | Maximum crystal area value ($\mu m^2$) | Average crystal area value at surface ($\mu m^2$) | Presence/Absence of cracks after thermal cycling test 480 cycles |
|---|---|---|---|---|---|
| 1 | 1.4 | 8109 | 51126 | 1988 | Present |
| 2 | 1.4 | 8071 | 43004 | 1945 | Present |
| 3 | 1.4 | 8114 | 40000 | 1989 | Absent |
| 4 | 1.4 | 8111 | 32222 | 1998 | Absent |
| 5 | 1.4 | 8067 | 28251 | 1911 | Absent |

Durability Test Result 3

For Sample No. 1 with the maximum crystal area value of 51126 $\mu m^2$ and Sample No. 2 with the maximum crystal area value of 43004 $\mu m^2$, cracks occurred in the first joining portions in the thermal cycling test of 480 cycles. However, for Samples No. 3 to 5 with the maximum crystal area values of 40000 $\mu m^2$ or less, cracks did not occur in the first joining portions in the thermal cycling test of 480 cycles.

TABLE 4

| Sample No. | Joint length (mm) | Average crystal area value ($\mu m^2$) | Maximum crystal area value ($\mu m^2$) | Average crystal area value at surface ($\mu m^2$) | Presence/Absence of cracks after thermal cycling test 500 cycles |
|---|---|---|---|---|---|
| 1 | 1.4 | 8121 | 32877 | 2572 | Present |
| 2 | 1.4 | 8111 | 33526 | 2128 | Present |

TABLE 4-continued

| Sample No. | Joint length (mm) | Average crystal area value ($\mu m^2$) | Maximum crystal area value ($\mu m^2$) | Average crystal area value at surface ($\mu m^2$) | Presence/Absence of cracks after thermal cycling test 500 cycles |
|---|---|---|---|---|---|
| 3 | 1.4 | 8004 | 34847 | 2000 | Absent |
| 4 | 1.4 | 7974 | 33442 | 1765 | Absent |
| 5 | 1.4 | 8022 | 35242 | 1439 | Absent |

Durability Test Result 4

For Sample No. 1 with the average crystal area value at surface of 2572 $\mu m^2$ and Sample No. 2 with the average crystal area value at surface of 2128 $\mu m^2$, cracks occurred in the first joining portions in the thermal cycling test of 500 cycles. However, for Samples No. 3 to 5 with the average crystal area values at surface of 2000 $\mu m^2$ or less, cracks did not occur in the first joining portions in the thermal cycling test of 500 cycles.

REFERENCE SIGNS LIST

1 Cell stack device
3 Fuel cell
4 Manifold
5 Cell stack
6 Reaction gas supply source (reformer)
9 Reaction gas (fuel gas) supply pipe
14 Insertion portion
14a Gap
14b First bent portion
14c Second bent portion
14d First through hole
14e Second through hole
17 First joining portion
18 Second joining portion
D1 Joint length
D2 Thickness of fuel gas supply pipe
D3 Thickness of manifold
D4 Gap length
20 Module (fuel cell module)
40 Module housing device (fuel cell device)
S1 First surface
S2 Second surface
S3 First contour line
S4 Second contour line
L1 First straight line
L2 Second straight line

What is claimed is:

1. A cell stack device comprising:
a cell stack comprising a plurality of cells, each of the plurality of cells having a columnar shape and internally comprising a gas flow passage, the plurality of cells being vertically arranged and electrically connected;
a manifold configured to fix lower ends of the plurality of cells and supply a reaction gas into the gas flow passages of the plurality of cells; and
a reaction gas supply pipe connected to the manifold and configured to supply the reaction gas to the manifold, wherein
the manifold and the reaction gas supply pipe are made of metal;
the manifold comprises:
an insertion portion configured to connect the reaction gas supply pipe to the manifold,
a gap between the insertion portion and the reaction gas supply pipe, and
a first joining portion configured to join the insertion portion and the reaction gas supply pipe and seal one end of the gap on an outer side of the manifold;
in an arbitrarily defined cross-section along an insertion direction of the reaction gas supply pipe, the first joining portion has a meniscus shape;
a joint length, in the insertion direction, between the first joining portion and the reaction gas supply pipe is longer than a thickness of the reaction gas supply pipe; and
a length of the gap in the insertion direction is longer than the thickness of the manifold.

2. The cell stack device according to claim 1, wherein the joint length is shorter than double the thickness of the reaction gas supply pipe.

3. The cell stack device according to claim 1, wherein in the arbitrarily defined cross-section along the insertion direction of the reaction gas supply pipe, the joint length in the insertion direction is longer than the thickness of the manifold.

4. The cell stack device according to claim 1, wherein in the arbitrarily defined cross-section along the insertion direction, an average crystal area is 10000 $\mu m^2$ or less with respect to crystals present in an analysis region that is defined by a portion of an outer cross-sectional perimeter of the first joining portion having a length of 500 $\mu m$, two parallel lines each having a length of 500 $\mu m$ and having respective start points at both ends of the portion of the outer cross-sectional perimeter of the first joining portion, and a line joining two end points of the parallel lines opposite the respective start points.

5. The cell stack device according to claim 4, wherein the average crystal area is 4000 $\mu m^2$ or less with respect to the crystals present in the analysis region.

6. The cell stack device according to claim 4, wherein a crystal area of all the crystals present in the analysis region is 40000 $\mu m^2$ or less.

7. The cell stack device according to claim 4, wherein in the analysis region, an average crystal area of crystals positioned along the portion of the outer cross-sectional perimeter of the first joining portion is 2000 $\mu m^2$ or less.

8. The cell stack device according to claim 1, wherein the reaction gas supply pipe is connected to a reaction gas supply source at one end of the reaction gas supply pipe,
the other end of the reaction gas supply pipe is inserted into a first through hole as the insertion portion provided in the manifold and joined to the manifold via the first joining portion, and
in the arbitrarily defined cross-section along the insertion direction of the reaction gas supply pipe, an angle $\theta 1$ is 30° or less, the angle $\theta 1$ being formed between a vertical line drawn from a first leading end portion of the first joining portion to the manifold, and a first straight line connecting the first leading end portion to a first point, the first point being located on a first contour line of the first joining portion and positioned at half a height from a first bottom portion to the first leading end portion of the first joining portion.

9. The cell stack device according to claim 1, wherein the first joining portion has a concave meniscus shape.

10. The cell stack device according to claim 8, wherein
a first bent portion of the manifold extending toward a side of the reaction gas supply source along the reaction gas supply pipe is provided around an outer periphery of the first through hole in the manifold, and
an upper end portion of the first bent portion and the reaction gas supply pipe are joined via the first joining portion.

11. A cell stack device comprising:
a cell stack device comprising: a cell stack comprising a plurality of cells, each of the plurality of cells having a columnar shape and internally comprising a gas flow passage, the plurality of cells being vertically arranged and electrically connected;
a manifold configured to fix lower ends of the plurality of cells and supply a reaction gas into the gas flow passages of the plurality of cells; and
a reaction gas supply pipe connected to a reaction gas supply source at one end of the reaction gas supply pipe and connected to the manifold, the reaction gas supply pipe configured to supply the reaction gas to the manifold, wherein
the manifold and the reaction gas supply pipe are made of metal;
the manifold comprises:
a main body portion comprising a space communicated with the gas flow passages and a second through hole,
a flange portion protruding from the main body portion, the flange portion comprising a first through hole;
the first hole is a first insertion portion and the second hole is a second insertion portion, each configured to connect the reaction gas supply pipe to the manifold;
a second gap is between the second insertion portion and the reaction gas supply pipe,
the reaction gas supply pipe is inserted into the first through hole, and the reaction gas supply pipe and the manifold are joined by a first joining portion;
the other end of the reaction gas supply pipe is inserted into the second through hole, and the other end of the reaction gas supply pipe and the manifold are joined via a second joining portion;
a first gap is between the first insertion portion and the reaction gas supply pipe;
the first joining portion is configured to seal one end of the first gap as a result of joining the first insertion portion and the reaction gas supply pipe;
in an arbitrarily defined cross-section along an insertion direction of the reaction gas supply pipe, the first joining portion has a meniscus shape; and
a first joint length, in the insertion direction, between the first joining portion and the reaction gas supply pipe is longer than a thickness of the reaction gas supply pipe.

12. The cell stack device according to claim 11, wherein the second joining portion has a concave meniscus shape.

13. The cell stack device according to claim 11, wherein
a second bent portion extending toward the side of the reaction gas supply source along the reaction gas supply pipe is provided by the manifold and around an outer periphery of the second through hole in the manifold, and
an upper end portion of the second bent portion and the reaction gas supply pipe are joined via the second joining portion.

14. A module comprising:
the cell stack device according to claim 1 contained in a housing container.

15. A module housing device comprising:
the module according to claim 14;
an auxiliary device configured to operate the module; and
an external casing configured to contain the module and the auxiliary device therein.

16. A cell stack device comprising:
a cell stack comprising a plurality of cells, each of the plurality of cells having a columnar shape and internally comprising a gas flow passage, the plurality of cells being vertically arranged and electrically connected;
a manifold configured to fix lower ends of the plurality of cells and supply a reaction gas into the gas flow passages of the plurality of cells; and
a reaction gas supply pipe connected to the manifold and configured to supply the reaction gas to the manifold, wherein
the manifold and the reaction gas supply pipe are made of metal;
the manifold comprises:
an insertion portion configured to connect the reaction gas supply pipe to the manifold,
a gap between the insertion portion and the reaction gas supply pipe, and
a first joining portion configured to seal one end of the gap as a result of joining the insertion portion and the reaction gas supply pipe;
in an arbitrarily defined cross-section along an insertion direction of the reaction gas supply pipe, the first joining portion has a meniscus shape and an average crystal area is 10000 $\mu m^2$ or less with respect to crystals present in an analysis region that is defined by a portion of an outer cross-sectional perimeter of the first joining portion having a length of 500 $\mu m$, two parallel lines each having a length of 500 $\mu m$ and having respective start points at both ends of the portion of the outer cross-sectional perimeter of the first joining portion, and a line joining two end points of the parallel lines opposite the respective start points; and
a joint length, in the insertion direction, between the first joining portion and the reaction gas supply pipe is longer than a thickness of the reaction gas supply pipe.

17. The cell stack device according to claim 16, wherein the average crystal area is 4000 $\mu m^2$ or less with respect to the crystals present in the analysis region.

18. The cell stack device according to claim 16, wherein a crystal area of all the crystals present in the analysis region is 40000 $\mu m^2$ or less.

19. The cell stack device according to claim 11,
in the arbitrarily defined cross-section along the insertion direction of the reaction gas supply pipe, an angle $\theta 2$ is 30° or less, the angle $\theta 2$ being formed between a vertical line drawn from a second leading end portion of the second joining portion to the manifold, and a second straight line connecting the second leading end portion to a second point, the second point being located on a second contour line of the second joining portion and positioned at half a height from a second bottom portion to the second leading end portion of the second joining portion.

20. The cell slack device according to claim 11, wherein
the second joining portion is configured to seal one end of the second gap as a result of joining the second insertion portion and the reaction gas supply pipe; and a second joint length, in the insertion direction, between the second joining portion and the reaction gas supply pipe is longer than a thickness of the reaction gas supply pipe.

* * * * *